(No Model.)

J. E. E. GOWARD.
RACE TRACK HARROW AND LEVELER.

No. 506,491. Patented Oct. 10, 1893.

Witnesses.
Henry Marsh.
L. Estella Palmadge

Inventor.
John E. E. Goward
by A. H. Beuser
attorney

UNITED STATES PATENT OFFICE.

JOHN E. E. GOWARD, OF BOSTON, MASSACHUSETTS.

RACE-TRACK HARROW AND LEVELER.

SPECIFICATION forming part of Letters Patent No. 506,491, dated October 10, 1893.

Application filed June 13, 1892. Serial No. 436,439. (No model.)

*To all whom it may concern:*

Be it known that I, JOHN E. E. GOWARD, of Boston, in the county of Suffolk and State of Massachusetts, have invented certain new and useful Improvements in Race-Track Brushes and Smoothers, of which the following, taken in connection with the accompanying drawings, is a specification.

The object of this invention is to provide an improved track-leveling and smoothing device for race-courses and like uses, such devices being adapted to lightly stir and brush the surface as it is drawn forward.

My invention consists in a series of parallel independent chains formed of alternate rings and connecting hooks or links, such chains being secured at their front and rear ends to transverse bars of a length equal to the desired width of the device. These rings are of peculiar construction, being circular in outline and in cross section, and preferably studded on both sides with a series of blunt conical teeth. They are made of cast iron, about four inches in diameter and three-eighths of an inch in section so as to weigh about one-half pound each, and each is furnished with an eye at front and rear to receive the connecting hooks. The front cross-bar has draft hooks or rings secured to it, to receive the trace chains, said bar being preferably beveled at its front edge and furnished with metallic shoes to save wear and make the device slide more freely. The several chains are about four inches apart from center to center, and are, hence, in practical contact. Being independent of each other or laterally disconnected they may be separately reversed when desired by giving a half turn to the screw eyes which connect each to the cross bars. The whole apparatus may, however, be inverted and used upside down; and it may be folded or rolled up around the cross bars and made quite compact for transportation or storage.

Figure 1:
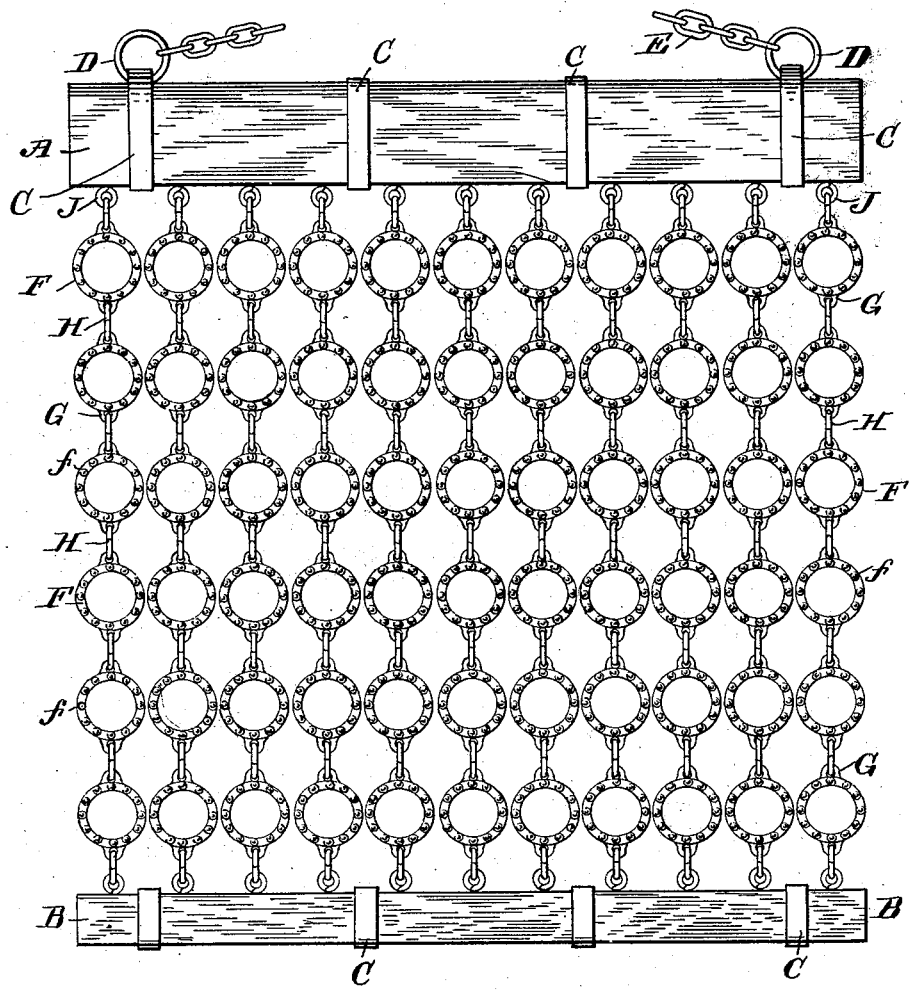
Figure 2:
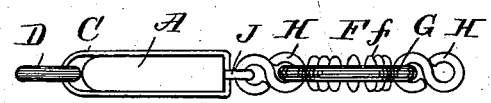
Figure 3:
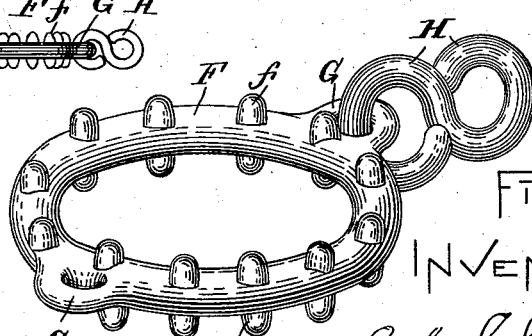

In the drawings, Figure 1 is a plan of one of my improved track-brushes complete. Fig. 2 is an end view of the front cross-bar, showing one of the toothed rings connected thereto. Fig. 3 is an enlarged perspective view of one of these peculiar rings and its connecting hook.

A represents the front and B the rear cross-bar of hard pine or the like, each having transverse iron bands C around it at intervals forming shoes which lift the body of the bar slightly, ease its movement, and reduce wear upon it. These bands or shoes passing entirely around the bar enable it to be used either side up; and the draft chains E may engage with rings D connected to these shoes.

The chains which compose the body of my smoothing device are laterally disconnected and independent of each other, and are composed of a series of toothed rings F $f$ having eyes G to receive the hooks or links H which unite the rings of each series into a chain and connect the chain by screw eyes J or otherwise to the two cross bars A B. The teeth $f$ are of a blunt conical character and protrude from both sides of each ring so as to brush, scratch or rake the track surface over which the device is moved by hand or horse-power. The effect is peculiarly satisfactory, and the track surface is speedily put in fine condition by this simple means. There being no transverse connection of the several chains, other than the front and rear cross-bars, the device has a flexibility adapting it to all conditions of surface. By lifting the rear bar B while the team advances, any straw or other matter raked up is readily discharged.

I claim as my invention—

1. The improved track-brush and smoothing device, consisting of the front and rear cross-bars A B and the series of parallel, independent or laterally-disconnected chains united to said cross bars, such chains being formed of broad rings having eyes and connecting hooks or links engaging the eyes of adjacent rings in the same chain only, substantially as and for the purpose set forth.

2. The combination of cross-bars A B and independent chains connecting said bars, each chain having a connected series of circular rings formed with protruding conical teeth on each of their faces, substantially as and for the purpose set forth.

In testimony whereof I have signed my name to this specification, in the presence of two subscribing witnesses, on this 9th day of March, A. D. 1892.

JOHN E. E. GOWARD.

Witnesses:
A. H. SPENCER,
ELIHU G. LOOMIS.